US012716794B2

(12) United States Patent
Praske et al.

(10) Patent No.: US 12,716,794 B2
(45) Date of Patent: Aug. 25, 2026

(54) SENSOR SYSTEM FOR REMOTE SURVEILLANCE OF CABLE SYSTEMS UNDER TENSION

(71) Applicant: anyCOMM Holdings Corporation, Gold River, CA (US)

(72) Inventors: Robert M. Praske, Eldorado Hills, CA (US); T. Allan Hamilton, Dripping Springs, TX (US); Keith Scott, Gardnerville, NV (US)

(73) Assignee: ANYCOMM HOLDINGS CORPORATION GOLD, Gold River, CA (US)

( * ) Notice: Subject to any disclaimer, the term of this patent is extended or adjusted under 35 U.S.C. 154(b) by 274 days.

(21) Appl. No.: 18/592,948

(22) Filed: Mar. 1, 2024

(65) Prior Publication Data

US 2024/0295451 A1 Sep. 5, 2024

Related U.S. Application Data

(60) Provisional application No. 63/449,697, filed on Mar. 3, 2023.

(51) Int. Cl.
*G01L 5/00* (2006.01)
*G01L 5/04* (2006.01)
*G08B 21/18* (2006.01)

(52) U.S. Cl.
CPC .............. *G01L 5/047* (2013.01); *G08B 21/18* (2013.01)

(58) Field of Classification Search
CPC ................................ G01L 5/047; G08B 21/18
See application file for complete search history.

(56) References Cited

U.S. PATENT DOCUMENTS 4,635,055 A 1/1987 Fernandes et al.
5,235,861 A 8/1993 Seppa
9,576,475 B2 * 2/2017 Bardin .................. G08C 17/02
2011/0178731 A1 * 7/2011 Munoz Ochovo ...... G01L 5/107 702/43
2015/0068318 A1 * 3/2015 Bardin .................... G01L 5/047 73/828
2025/0244407 A1 * 7/2025 Houle-Paradis ....... G01R 31/58

FOREIGN PATENT DOCUMENTS

CN 201145621 Y * 11/2008

OTHER PUBLICATIONS

International Search Report and Written Opinion cited in PCT Application No. PCT/US24/18014 dated Jun. 18, 2024, 12 Pages.

* cited by examiner

*Primary Examiner* — Francis C Gray
(74) *Attorney, Agent, or Firm* — Reed Smith LLP; Nina Habib Borders; Richard J. Brown

(57) ABSTRACT

A device, system and method to provide remote surveillance of static cable systems under tension, for prediction and/or notification of tower or cable failure. The device includes a one or more processors and memory in a controller; a cable tension sensor; and a communications module for wireless bi-directional communication with a central monitoring system. The system includes a plurality of the devices and a central monitoring system for processing data and communicating with the device and outside entities.

26 Claims, 6 Drawing Sheets

SENSOR SYSTEM FOR REMOTE SURVEILLANCE OF CABLE SYSTEMS UNDER TENSION

CROSS-REFERENCE TO RELATED APPLICATIONS

This application claims the benefit of U.S. Provisional Application Ser. No. 63/449,697 filed Mar. 3, 2023, the contents of which are incorporated herein in its entirety.

TECHNICAL FIELD

The disclosed embodiments relate to a device, system and method to provide remote surveillance of, and tower or cable failure prediction, for static cable systems under tension.

SUMMARY OF THE DISCLOSED SUBJECT MATTER

A first aspect provides a device configured for attachment to a cable or wire under tension, such as a static cable, the device comprising one or more processors; a tension sensor configured to measure tension in a cable or wire to which it is attached; and a communications module for wireless bi-directional communication with a central monitoring system, wherein the one or more processors is configured to execute computer readable instructions to receive a tension measurement from the tension sensor and communicate the tension measurement to the central monitoring system via the communications module.

Embodiments of the device include the following, alone or in any combination.

The device wherein the one or more processors is further configured to execute computer readable instructions to determine whether the tension measurement received from the tension sensor comprises an instantaneous or long-term deviation from a desired tension in the cable the tension sensor is attached to; and communicate the instantaneous or long-term deviation to the central monitoring system.

The device may be further configured to attach to a power transmission line and receive power via electromagnetic induction from the power transmission line; and optionally further comprising at least one additional sensor selected from a voltage sensor, an amperage sensor or a tension load sensor, wherein the one or more processors is configured to execute computer readable instructions to receive a measurement from the at least one additional sensor and communicate the measurement to the central monitoring system.

Additional embodiments of the device include embodiments disclosed in the Embodiments section.

A second aspect provides a distributed networked computer system for remote monitoring of cable systems under tension, the distributed network computer system comprising: a central monitoring system comprising one or more centralized servers configured to execute computer readable instructions to receive, collect, store and analyze data related to the remote monitoring; a plurality of devices attached to a plurality of static cables or wires under tension; each device comprising one or more processors; a tension sensor configured to measure tension in a cable or wire to which it is attached; and a communications module for wireless bi-directional communication with the central monitoring system, wherein the one or more processors is configured to execute computer readable instructions to receive a tension measurement from the tension sensor and communicate the tension measurement to the central monitoring system via the communications module.

Embodiments of the distributed networked computer system include the following, alone or in any combination. Additional embodiments are listed in the Embodiments section. Additional embodiments also include embodiments of the devices described above or in the Embodiments section.

The distributed networked computer system wherein the cable system comprises a high voltage transmission system comprising towers and high voltage transmission lines supported by the towers; and the devices are attached to guy wires stabilizing the towers, the high voltage transmission lines or a combination of guys wires and high voltage transmission lines.

The distributed networked computer system wherein stored data comprises information associated with each of the plurality of devices comprising one or more of device identification code, device location, communication channel identification, device characteristics, device condition and device functionality.

The distributed networked computer system wherein the stored data further comprises tension measurements received from each of the plurality of devices linked to the information associated with each device.

The distributed networked computer system wherein the one or more processors on each of the plurality of device or one or more processors in the one or more servers is further configured to execute computer readable instructions to determine whether the tension measurement received from the tension sensor of each of the plurality of devices comprises an instantaneous or long-term deviation from a desired tension in the cable the tension sensor is attached to.

The distributed networked computer system may further comprise a plurality of local access nodes associated with the plurality of devices, one or more concentrator servers, or a combination of local access nodes and one or more concentrator servers configured to provide secure communications links among the plurality of devices and the central monitoring system.

The distributed networked computer system may further comprise secure communication links to a plurality of devices associated with a plurality of authorized human users of the distributed networked computer system.

The distributed networked computer system may further comprise secure communication links between the plurality of devices associated with a plurality of authorized human users of the distributed networked computer system and the plurality of devices attached to the plurality of static cables or wires under tension.

The distributed networked computer system wherein the one or more processors on the centralized servers are configured to execute computer readable instructions to receive data from the plurality of devices; store the data received from the plurality of devices; aggregate the data received from the plurality of devices; determine whether the aggregated data are predictive or indicative of a failure mode in the cable system; and communicate an alert related to the failure mode to one or more human users authorized to receive the alert.

The distributed networked computer system wherein the one or more human users comprise operators of the central monitoring system, personnel associated with the owner or operator of the cable system, personnel associated with emergency response services, or combinations thereof.

The distributed networked computer system wherein the one or more processors on the centralized servers are further configured to execute computer readable instructions to compare data received from a set of the devices over one or more variables selected from time, location, tension, tension load, torsion and video image progression to detect variations among the set of devices.

The distributed networked computer system wherein the one or more processors on the centralized servers are further configured to execute computer readable instructions to track trends in the data from a single device for comparative analyses.

The distributed networked computer system wherein the one or more processors on the centralized servers are further configured to execute computer readable instructions to enable one or more of discovery of peripherals connected to a given device, communicate instructions to the given device to enable connecting a peripheral to the given device, and communicate instructions to one or more processors on the given device to supply auxiliary power to a peripheral connected to the given device.

Another aspect provides a method executed by one or more computing devices for remote monitoring of cable systems under tension, the method comprising: receiving data from a plurality of devices attached to a plurality of static cables or wires under tension; each device comprising one or more processors; a tension sensor configured to measure tension in a cable or wire to which it is attached; and a communications module for wireless bi-directional communication with the central monitoring system, wherein the one or more processors is configured to execute computer readable instructions to receive a tension measurement from the tension sensor and communicate the tension measurement to a central monitoring system via the communications module; storing the data received from the plurality of devices; aggregating the data received from the plurality of devices; determining whether the aggregated data are predictive or indicative of a failure mode in the cable system; and communicating an alert related to the failure mode to one or more human users authorized to receive the alert.

Embodiments of the method distributed networked computer system include the following, alone or in any combination. Additional embodiments are listed in the Embodiments section. Additional embodiments also include embodiments of the devices and/or distributed networked computer system described above or in the Embodiments section.

The method wherein the one or more computing devices are instantiated in a distributed networked computer system comprising: a central monitoring system comprising one or more centralized servers configured to execute computer readable instructions to receive, collect, store and analyze data related to the remote monitoring; and the plurality of devices attached to the plurality of static cables or wires under tension.

The method wherein the one or more human users comprise operators of the central monitoring system, personnel associated with the owner or operator of the cable system, personnel associated with emergency response services, or combinations thereof.

Another aspect provides at least one non-transitory computer-readable medium storing computer-readable instructions for remote monitoring of cable systems under tension, when executed by one or more computing devices of a distributed networked computer system, cause at least one of the one or more computing devices to: receive data from a plurality of devices attached to a plurality of static cables or wires under tension; each device comprising one or more processors; a tension sensor configured to measure tension in a cable or wire to which it is attached; and a communications module for wireless bi-directional communication with the central monitoring system, wherein the one or more processors is configured to execute computer readable instructions to receive a tension measurement from the tension sensor and communicate the tension measurement to a central monitoring system via the communications module; store the data received from the plurality of devices; aggregate the data received from the plurality of devices; determine whether the aggregated data are predictive or indicative of a failure mode in the cable system; and communicate an alert related to the failure mode to one or more human users authorized to receive the alert.

Embodiments of the method include the following, alone or in any combination. Additional embodiments are listed in the Embodiments section. Additional embodiments also include embodiments of the devices, distributed networked computer system, and/or methods described above or in the Embodiments section.

The at least one non-transitory computer-readable medium wherein the one or more computing devices are instantiated in a distributed networked computer system comprising: a central monitoring system comprising one or more centralized servers configured to execute computer readable instructions to receive, collect, store and analyze data related to the remote monitoring and in the plurality of devices attached to the plurality of static cables or wires under tension.

The at least one non-transitory computer-readable medium wherein the one or more human users comprise operators of the central monitoring system, personnel associated with the owner or operator of the cable system, personnel associated with emergency response services, or combinations thereof.

DETAILED DESCRIPTION OF THE DISCLOSED SUBJECT MATTER

Figure 1:
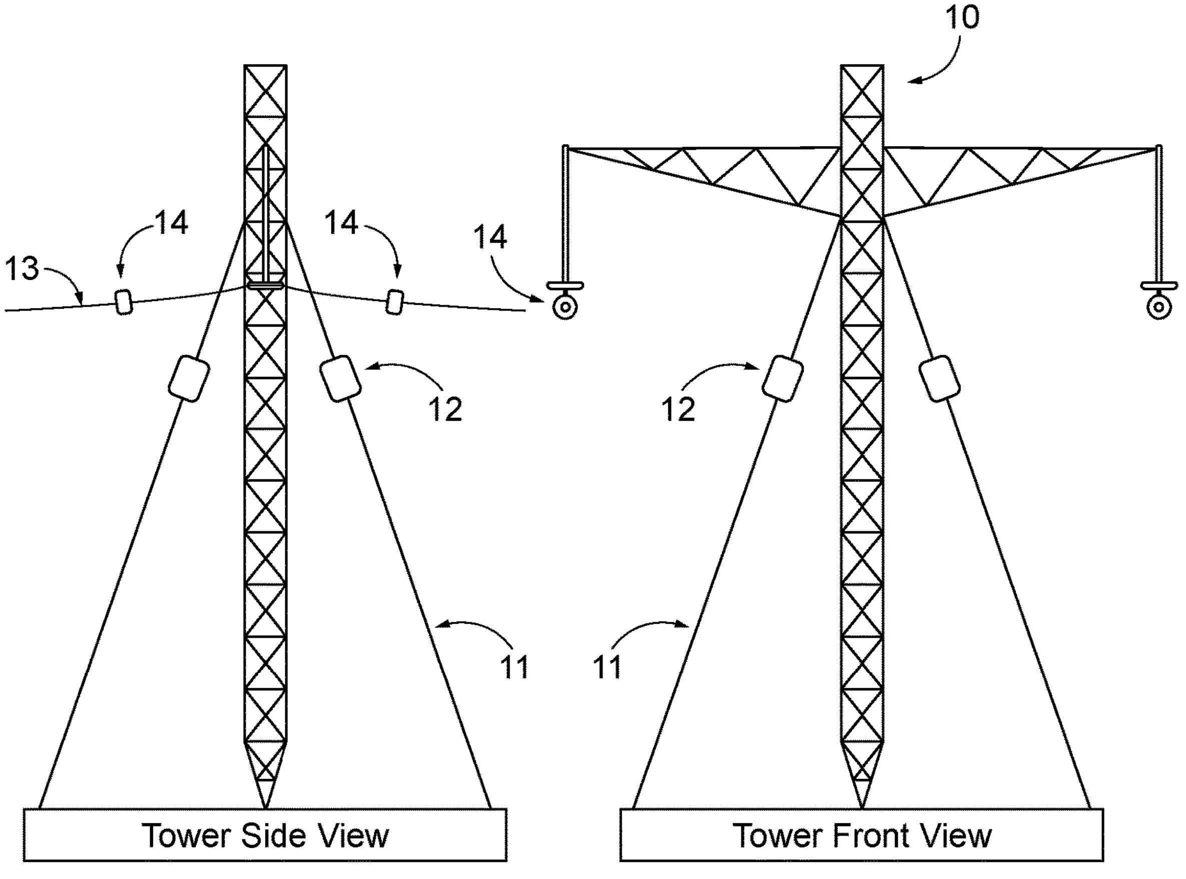
FIG. 1 shows aspects of positioning sensor packages on cables associated with a power transmission system, according to an exemplary embodiment of the disclosed subject matter.

Methods, systems, user interfaces, and other aspects of the invention are described. Reference will be made to certain embodiments of the invention, examples of which are illustrated in the accompanying drawings.

While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Devices according to this disclosure may also be interchangeably described or designated as sensor subsystems, Sensor Packages, Sensor Package Subsystems, or SPSs.

This invention provides an automated system and method for remotely monitoring and regularly reporting tension, torsion, spatial variations, and other surveillance data (e.g. video and audio) of static cable systems under tension. There can be many thousands of these sensor subsystems in a typical system. Each individual sensor subsystem includes a unique ID and a communication link to a back end, central monitoring system at a Network Operation Center (NOC) for data collection and analysis. As used herein, the term Network Operations Center and the abbreviation NOC may be used interchangeably with the central monitoring system. The analysis of this data at the NOC enables quantitative failure prediction of the cable and the tower and enables maintenance to be triggered in advance of a tower failure. Automated data analysis is conducted by computer systems at the NOC. Human users or operators may also be present at, or in communication with, the NOC to respond to alerts generated by the automated computerized systems.

While the initial application of this invention as described herein is targeted at a utility transmission tower and its multiple cables, guy wires and the power transmission lines themselves, it will be seen by those skilled in the art, that it is equally applicable for any structure with cable systems under tension including cable based, guy-wired secured towers including but not limited to cellular infrastructure towers, microwave communication towers, television and radio towers and the like. Furthermore, this system can also provide a remote surveillance and failure prediction solution for the high voltage transmission lines on the utility towers themselves. Other structures with cable systems under tension include, for example, cable stay bridges and suspension bridges, wherein the towers are self-supporting, and the cables support a horizontal load including a bridge deck and vehicles thereon.

Secondarily, the sensor package subsystems monitor environmental elements, for example, structural changes of power transmission towers or smaller power poles; anchors or other connection points to which the cable is connected; non-system elements such as sway of transmission power lines or sway/physical degradation of insulators; and environmental hazards such as fire, smoke, wind, as well as trespassers or vandalism in the vicinity.

FIG. 1 shows aspects of positioning sensor packages on cables associated with a power transmission system. A plurality of spaced apart towers are installed to support wires carrying electricity from one geographic location to another, which may be separated by hundreds of kilometers or more and may need to cross remote or difficult terrain. Often, a plurality of transmission lines emanate from a power generation installation, such as a hydroelectric plant, solar panel farm, wind turbine farm, coal-, oil- or natural gas-fueled power generation plant, or a nuclear power plant, and any combinations thereof to form part of an electrical grid. One can appreciate that an integrated power grid may contain thousands of individual towers, each of which may support multiple power lines and may themselves need support from a plurality of guy wires to remain upright. One can also appreciate that direct inspection of each tower by human operators for a modern power grid is a formidable task. The system described herein provides for remote surveillance of power transmission lines by autonomous sensors in communication with a centralized facility with a central monitoring system to provide regular, continuous monitoring of the state of power transmission systems without the need for human inspectors to visit and monitor individual sites in the system.

Side and front views of a single representative tower 10 for carrying high voltage transmission cables are shown in FIG. 1. The illustrated tower 10 is supported by one or more cable stay guy wires 11 under tension to hold the tower in an upright configuration. The cable stays 11 are typically configured in a linear diagonal configuration leading from the upper portion of the tower to an anchor at ground level. The cable stays 11 may be considered as static cables in that they are not moving, but tension on each cable may vary as environmental forces such as wind, precipitation, etc, act on the tower they are supporting. As shown in FIG. 1, a tower 10 may typically have four guy wires 11, but this number is not limiting. Alternatively, cable stays may not be anchored directly to the ground, but may be anchored to structures near the tower. Sensor packages 12 (SPS) as described herein are positioned on each cable stay 11 as shown at a first position to measure tension of the cable and other parameters. The positioning of the sensors 12 on the guy wires 11 is not crucial, but desirably they are located high enough on the guy wires 11 to preclude tampering with the sensors 12. The electrical transmission lines 13 are strung between towers in a series of catenary curves. Sensor packages 14 as described herein may positioned on each transmission line 13 as shown at a second position to measure tension of the transmission line 13 and other parameters as environmental forces act on the transmission line. In some embodiments, the transmission line 13 may be supported by a load cable (not shown) that does not carry electricity but has a higher tensile strength than the electrical line 13. Some towers may be self-supporting, such that they do not need cable stays 11 to keep them upright. However, such towers would have sensor packages 14 on the transmission lines 13 to measure tension of the transmission lines 13.

Figure 2:
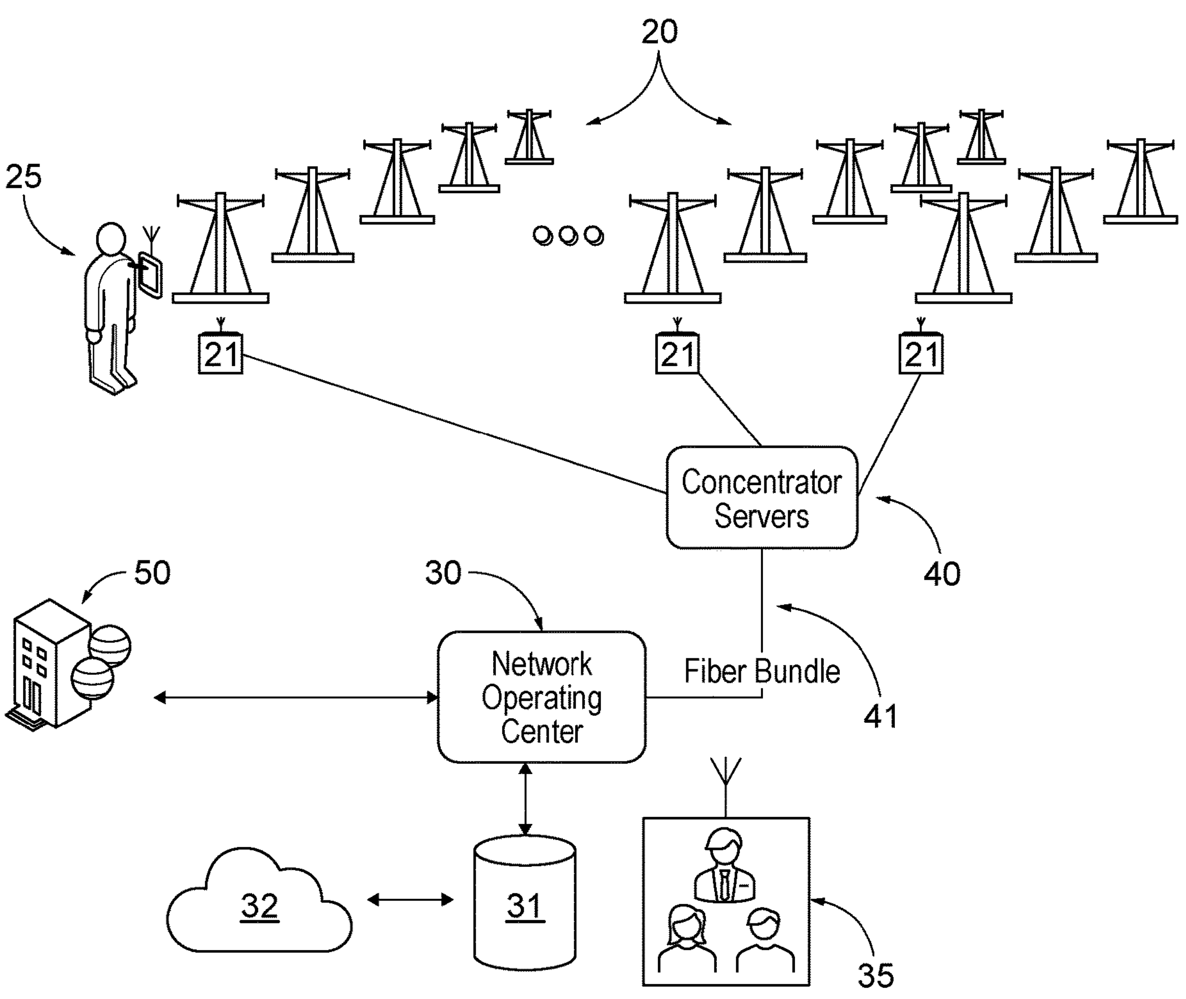
FIG. 2 shows aspects of a communication system and network operation center associated with a power transmission system, according to an exemplary embodiment of the disclosed subject matter.

FIG. 2 schematically shows aspects of a communication system and network operation center associated with a power transmission system for monitoring the state of the power transmission system. The communication system and network operation center may be embodied in a distributed networked computer system comprising the sensors and central monitoring systems described herein. A plurality of transmission lines 20 comprising towers 10 with sensor packages 12 and/or 14 may be linked to a network operations center (NOC) 30. Each individual sensor package 12 or 14 for all sensor package-enabled towers as shown in FIG. 1 is configured to communicate wirelessly to a centralized network operation center (NOC) 30 either directly or through access point nodes 21 located throughout a utility's area of operation. For example, local access point nodes 21 may be associated with (installed on) given individual high voltage transmission towers, where each local access node 21 is configured to receive data from a plurality of SPS devices on cables associated with the given tower and communicate those data to the NOC. Additional sensor packages such as weather stations, cameras, and sensor packages for wildfire detection may also be installed on or associated with the towers and linked to the NOC 30 via the local access point nodes 21. The access point nodes may also comprise solar cells and/or batteries to supply power to the access point nodes.

Utility staff 25 in the field can access the data on each and every Sensor Package by scanning a UPC or QR code at any tower and receive the data via a secure wireless link from the NOC 30. Field utility staff 25 may also read tension data directly from a digital read-out display on the SPS. Utility staff 25 may also access data from a Sensor Package by entering or selecting its identifier code in a mobile device such as a cell phone, smart pad etc., linked to the Sensor Package via an associated local access node, concentrator server 40 or the NOC. Once installed and enabled by a field installer, each Sensor Package can autonomously transmit data from itself to the NOC 30, either directly or aggregated through communications systems, where human operators and computer-implemented methods can monitor the data transmitted.

For example, concentrator servers 40 provide a secure connection and feed directly to the operations datacenter (the NOC) via, for example, a high-capacity optical fiber connection 41. All data collected from the field Sensor Package units 12 and 14 are managed at the Network Operations Center (NOC) via dedicated virtual private network (VPN) Servers. The VPN servers encrypt internet traffic on unsecured networks to ensure data privacy. The VPN extends access to a private network (one that disallows or restricts public access) for the sensor monitoring system to users who do not have direct access to the NOC, such as an office network allowing secure access from off-site over the internet for field personnel, utility management, other authorized users, etc.

Authorized users or operators can interface with the distributed networked computer system via user interfaces linked to the communications system. The user interfaces may be physically located at the NOC or they may be instantiated on any external device, which may be any computer, mobile device such as a cell phone, tablet, smart pad, smart watch or other remote resource that connects to the computing devices in the system 310 through the communications network. The user-input device may comprise one or more push-buttons, a touch screen, or other devices that allows a user to input information. In these embodiments, the computer system and devices linked to the computer system may further comprise a display to provide visual output to the user. The display may comprise any of a variety of visual displays, such as a viewable screen, a set of viewable symbols or numbers, and so on. System status, errors, alerts and other management information are located and processed at the NOC by the central monitoring system. Personnel 35 at or in communication with the NOC manage the NOC and can address alerts, errors etc. and/or direct them to personnel at the utility or in the field. In embodiments, servers at the NOC can autonomously forward status, errors, alerts and other management information directly to devices associated with users authorized to receive the information without human operator intervention. The NOC connects with management and maintenance personnel at the Utility 50 through secure internet connections.

The back-end NOC System 30 includes or is linked to:

A set of high-end server racks and local disk-based storage 31, optionally backed up to the cloud 32.

Human interface units such as one or a plurality of display panels, e.g. LCD displays, for providing system status and management. Other human interface units can include special alert screens, speakers and/or lights to signal SPS alerts.

Software tools to manage up to 10,000 SPS units in the field, which may be scalable to handle even more units.

Advanced software analytical tools to perform predictive failure analysis on the streams of data collected from the field-installed SPS.

A modem or modems for communication to the installed SPS and to human interface units outside the NOC, such as mobile devices for field utility personnel, field offices and utility management centers.

An uninterruptible Power Supply (UPS).

The Back-end NOC System is capable of:

Monitoring and managing SPS unit(s) i.e. from the Network Operations Center (NOC).

Establishing Groups of SPS units to facilitate management. For example, an individual tower could group 4 SPS positioned on cable stays at the first position and/or group a second set of SPS positioned on the electrical lines at the second position. Embodiments of sensors for a specific individual tower may comprise wired and/or wireless connectivity of sensors on each sensor package to a shared controller, communications module such as a local access node 21 and/or power supply to minimize the size of each sensor package and simplify communication to the back-end NOC. Individual towers or structures in a specific geographic area and/or along a specific transmission line could define a Super Group.

Two-way communication with an individual SPS, several SPS Groups or all SPS, via Wi-Fi, cellular connectivity or other suitable two-way wireless connectivity, including for example Bluetooth, LoRaWan, Zigbee, Zwave, Bluetooth Low Energy (BLE), for sending instructions to individual SPS, or to specific SPS Groups or to all SPS and receive data including cable tension data and data collected by other sensors from an individual SPS, several SPS Groups or all SPS. All communication may be encrypted to provide system security. BLE is designed to consume less power and operate over long periods, such as months or years. Based on power consumption, needs, data rates or other considerations, a suitable connectivity protocol or combinations of protocols can be selected.

In embodiments, communication among the sensors and the NOC can include a self-organizing network (SON). A SON is an automation technology designed to make the planning, configuration, management, optimization and healing of radio access networks simpler and faster. SONs can be architecturally organized as a distributed SON, a centralized SON and hybrid SONs. In a distributed SON, functions are distributed among the network elements at the edge of the network (e.g. the individual sensors). In a centralized SON, functions may be more concentrated closer to higher-order network nodes or the network OSS, to allow a broader overview of more edge elements and coordination of e.g. load across a wide geographic area. Hybrid SONs comprise a mix of centralized and distributed SON elements. Self-organizing network functionalities include self-configuration functions, self-optimization functions and elf-healing functions and self-protection functions.

Self-configuration strives towards the "plug-and-play" paradigm in the way that new nodes, such as such as a local wireless access point 21, are automatically configured and integrated into the network. When a new node is introduced into the network and powered on, it gets immediately recognized and registered by the network. Neighboring nodes then automatically adjust their technical parameters (such as emission power, antenna tilt, etc.) in order to provide the required coverage and capacity and at the same time, avoid interference. Each node may contain hundreds of configuration parameters that control various aspects of the cell site. The SON may establish neighbor relations automatically (ANR) or optimize random access parameters depending on how many nodes are transmitting to the NOC. When nodes in the network become inoperative, self-healing mechanisms aim at reducing the impacts from the failure, for example by adjusting parameters and algorithms in adjacent cells so that other nodes can support communication with devices that were supported by the failing node. Self-protection is a proactive approach of a system for defending itself from the penetration of any unauthorized user in the system and from any active or passive attack.

Sending over-the-air (OTA) firmware/software updates to the SPS unit(s).

Monitoring the status of the SPS unit(s). Monitoring may include gathering, processing, organizing, and analyzing data, using state-of-the-art software tools, including comparing data of other like, similar or different SPS units over multiple variables (e.g. time, space, tension load, torsion, and video image progression) to detect variations. Monitoring may also include tracking near and long-term trends of data from a single field unit and making comparative analyses, in particular relative to a required standard (e.g. minimum cable tension—via tension meter; cable sag—via spatial data from accelerometer and video). Monitoring and analyzing video data from field unit(s) to detect variations in the physical environment 1) relative to a required standard (e.g. maximum allowable insulator sway in the wind or allowable degradation of insulator attachment) or 2) over time, or 3) set to a particular trigger (e.g. smoke or fire detection). Monitoring video data from field unit(s) may also include detecting and analyzing corona video events associated with severe power line disruptions. Monitoring may also include periodically checking the "health" of the SPS, providing to the back-end server information related to characteristics, conditions and functionality of the SPS, including functional irregularities.

Providing emergency triggers to the operators and utility company management, designed to initiate immediate action/response to a critical event, such as cable failure, cable degradation, downed line, fire, etc. Data collection and analysis from the plurality of sensor packages may allow immediate location of a critical problem for field crews to travel to and address the critical event. In some instances, an alert from a single sensor package may be indicative of a failure of that sensor package and not a system critical event, wherein reboot/repair/replacement of the sensor package may resolve the alert. Alerts from a plurality of sensor packages, particularly if the alerts come from a specific locus such as a specific utility tower or transmission line segment may signal a true system critical event.

Creating reports and/or packages of data (e.g. tension data over time, location; video clips; etc.).

Sending/circulating reports and/or alerts to authorized personnel (e.g. within the operations team; or to utility company personnel including field staff or management; regulators; and/or emergency response services such as a fire company, department or district or public safety organizations at the local, state or national level for occurrence of a critical event).

Figure 3A:
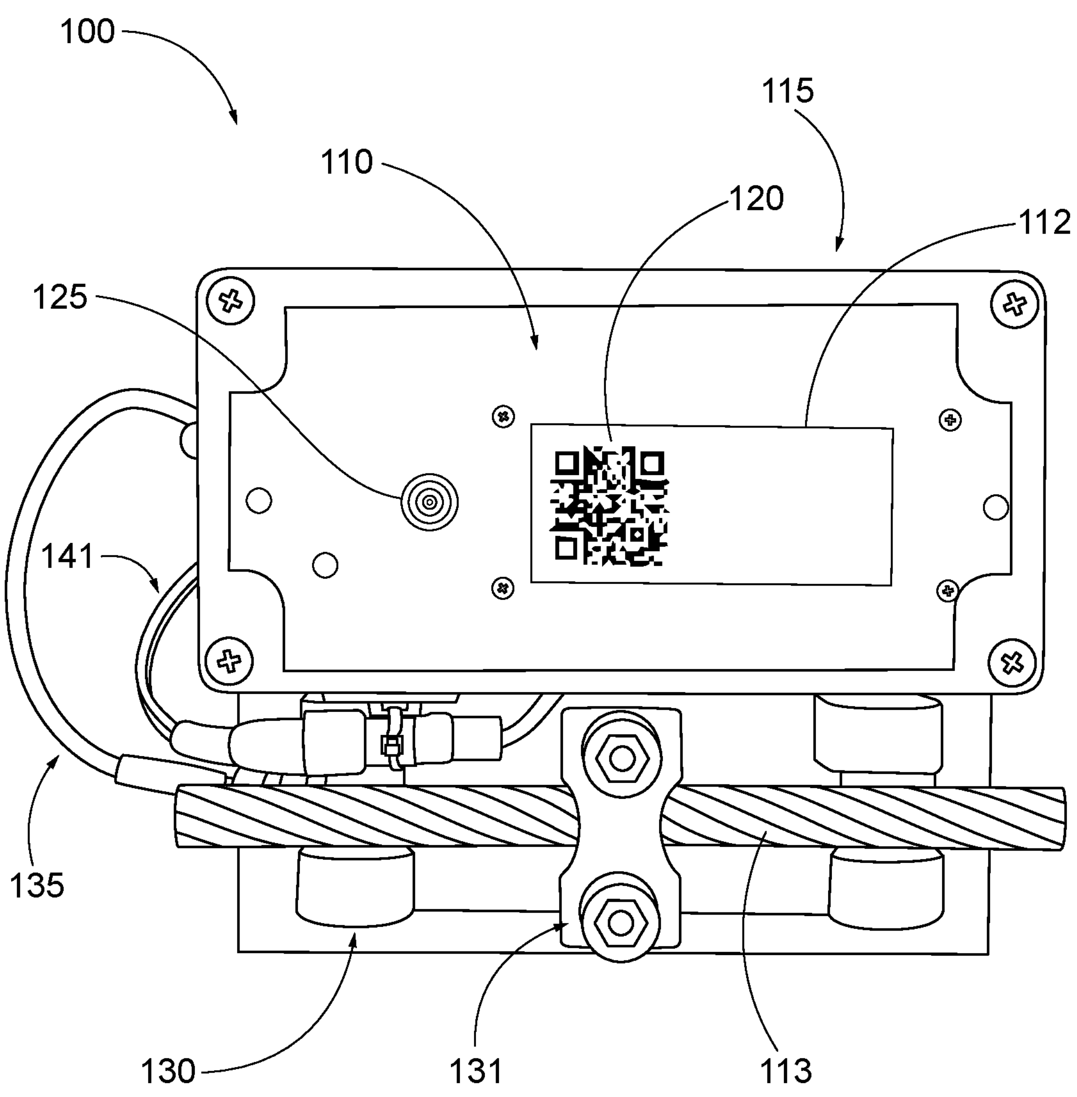
FIGS. 3A-D shows aspects of an exemplary sensor device for surveillance of cable tension, according to an exemplary embodiment of the disclosed subject matter.
Figure 3B:
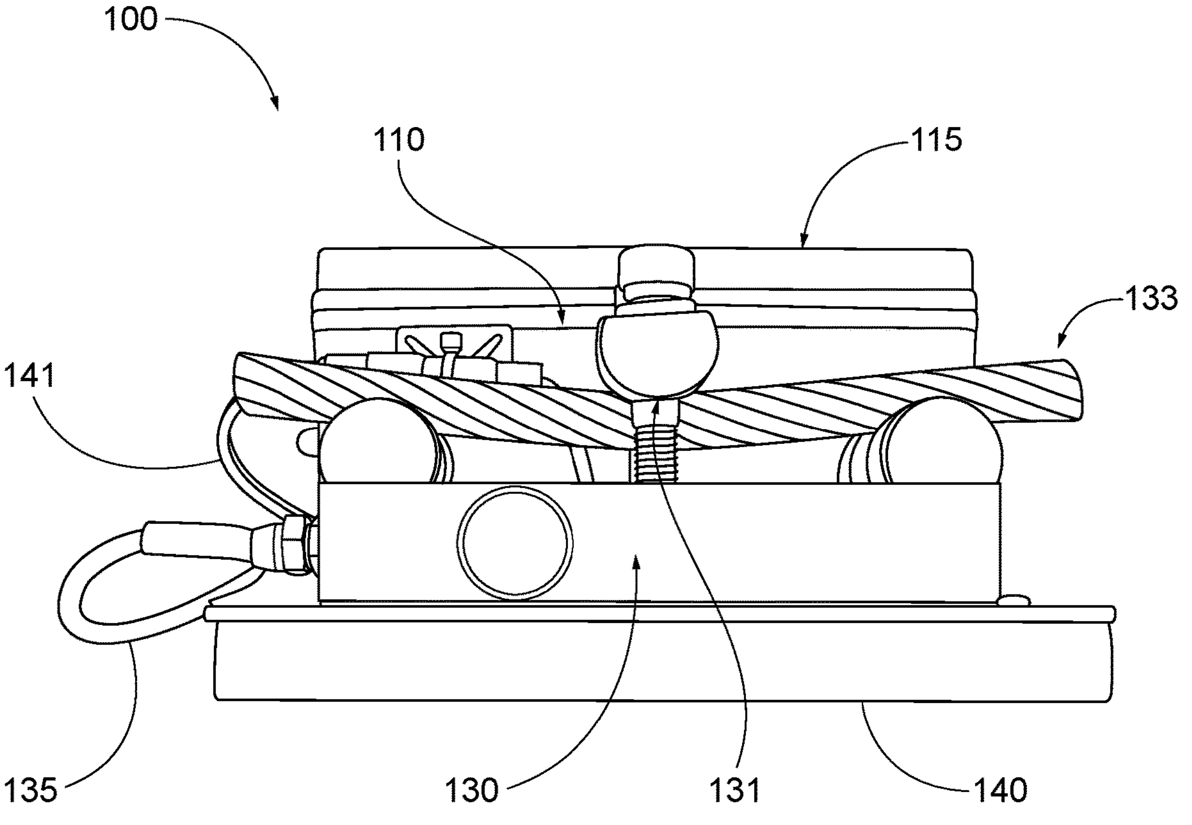
Figure 3C:
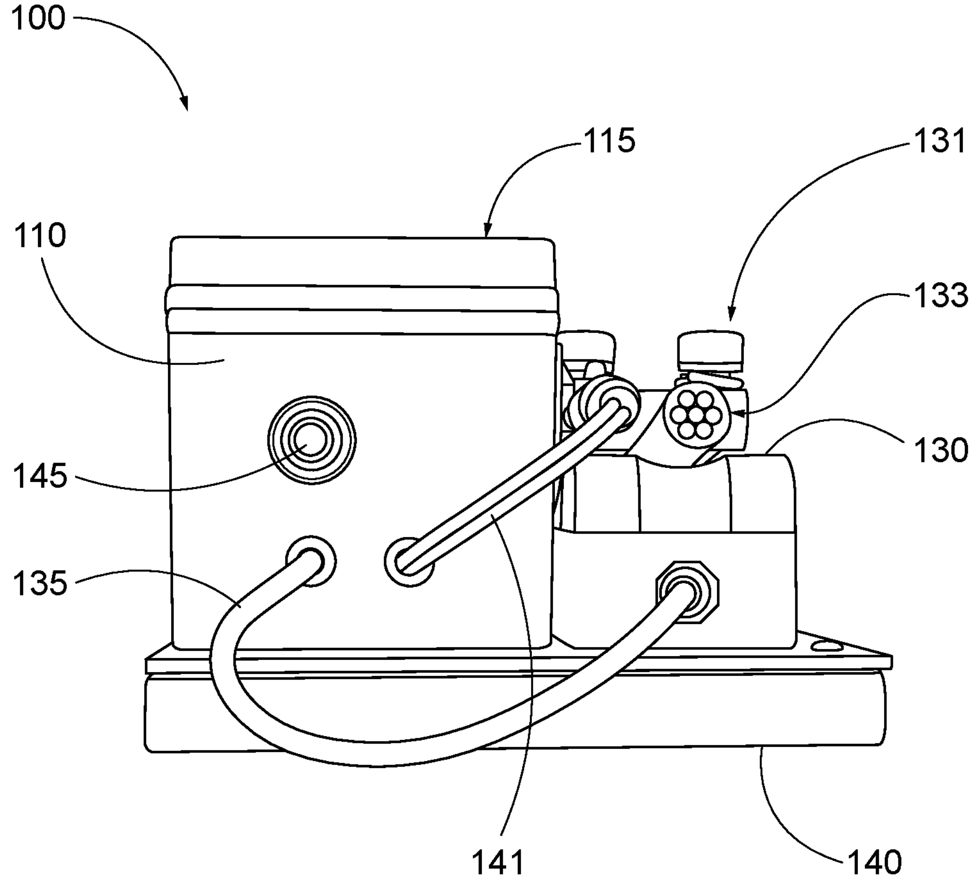
Figure 3D:
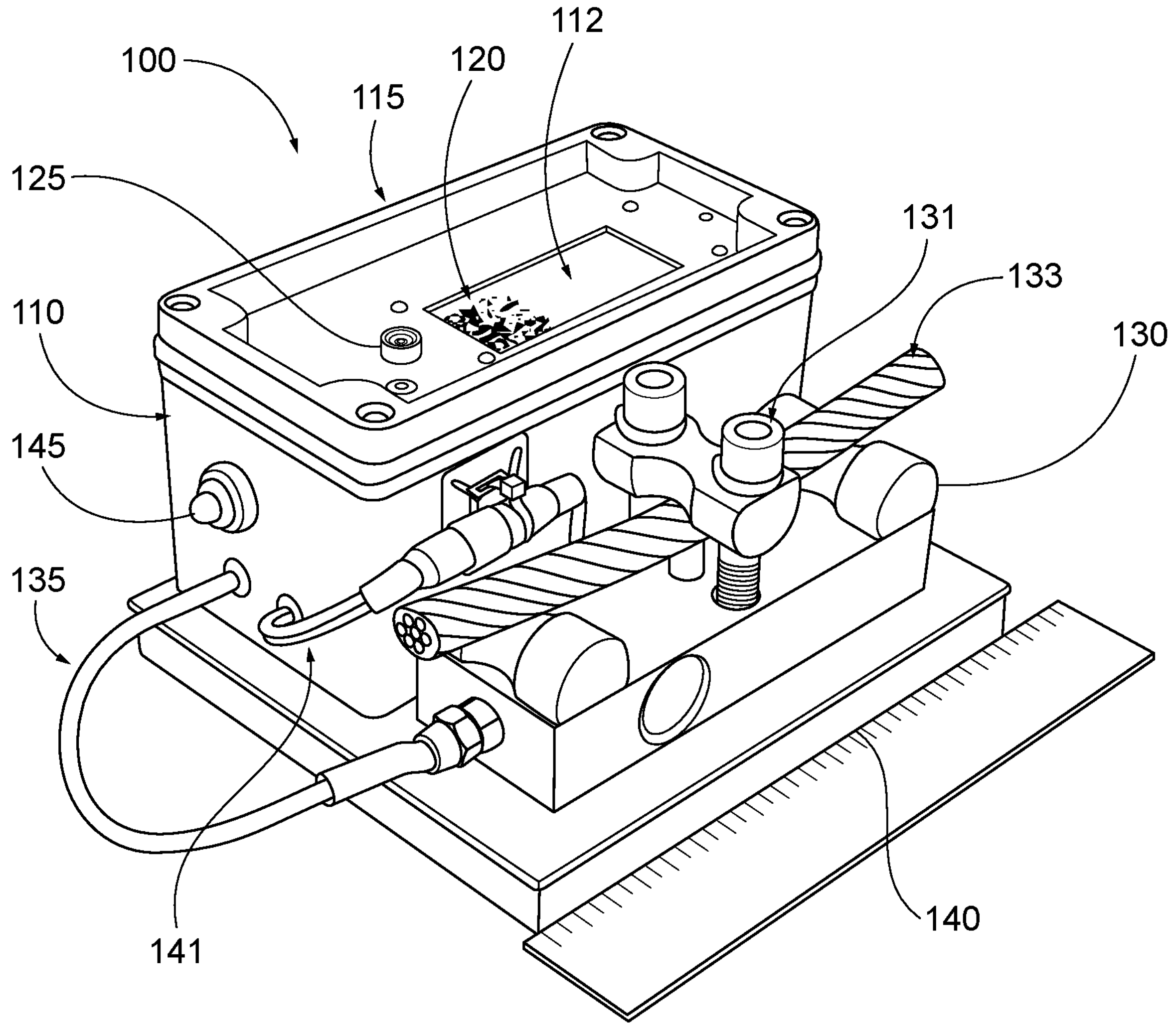

FIGS. 3A-3D show various views of a specific exemplary sensor package subsystem 100 for use in remote surveillance according to embodiments described herein. FIG. 3A shows a top view, FIG. 3B shows a side view, FIG. 3C shows an end view and FIG. 3D shows an oblique view. The illustrated Sensor Package Subsystem (SPS) 100 includes an electronic package 110 comprising one or more processors, controllers or microcontrollers for autonomous control of the functions of the sensor package, memory for storing operating instructions and collected data prior to communicating the data to the central monitoring system and/or other devices linked to the system, backup battery, and an optional status display 112 for displaying the measured tension and optionally other data. The SPS also comprises a tension sensor 130, which can measure and capture instantaneous and long-term deviations from an initially installed and calibrated tension (for example, from 4000 kgs to 10,000 kgs, such as 5000 kgs); a rugged physical connection 131 to attach the SPS to the cable 133 being monitored; a communications module within the electronics package 110 comprising one or more modems for communication to the Back-End NOC System, either through an intermediary communication system such as a local wireless access point 21, or directly; or communication with nearby authorized devices, such as a handheld device. As shown, the connection 131 may comprise a clamp engaged to a base plate of the tension sensor 130 with bolts or screws to hold the cable securely. A weather-resistant housing 115, designed for the type of environment in which it is operating, is used to package and protect the electronics and other components from the expected ambient conditions once installed. As illustrated, the housing 115 contains the electronic package 110 while other components such as the solar cell 140 may be attached or separately mounted to the outside of the housing 115 and connected to the electronics package with external wiring. In other embodiments, additional components may be further integrated within the housing.

An embodiment of a sensor of type 14 may comprise a toroidal-shaped housing for placement on a high-voltage line configured to clamp around the high-voltage line. The device in the toroidal-shaped version may further comprise sensor(s) for measuring/reading parameters for the electricity in the transmission line including a voltage sensor, which is an induction reading, an amperage sensor and/or a tension load sensor.

An uninterruptible power supply provides power to the sensor package system. In the embodiment 100, the sensor package comprises a solar cell 140 for generating electricity and a rechargeable battery (not shown) that can be recharged using electricity from the solar cell, and circuitry 141 to provide uninterruptible and surge-resistant electrical power to the device. A digital clock or other timing unit (not shown) may be included. The device, when mounted, can receive uninterruptible power continuously from a solar cell panel that charges an integral lithium battery, with current typical life without solar power of 15 or more days. A battery connect switch 145 may enable electrically connecting the battery to the solar panel 140. In other embodiments, a single solar panel may be mounted, such as on a transmission tower shown in FIG. 1, to provide power for a plurality of sensors on a plurality of cables associated with that tower. The device, when mounted on a high-voltage transmission line (embodiment 14), may be capable of receiving uninterruptible power via electromagnetic induction that charges an integral lithium battery, with current typical life without power of fifteen or more days. Devices configured to receive power from the transmission line by induction may not include a solar cell.

The device may further comprise a unique identifier for each device such as a UPC or QR code for unique device identification and communication purposes. A QR code may be visible on the exterior of the sensor package to facilitate an authorized installer activating, inspecting and/or communicating with the device via a handheld device. The unique identifier may be instantiated in an RFID chip within the device housing. In addition to field operators communicating with the individual sensor units, the sensor package is also enabled to communicate with one or more centralized facilities such as the NOC described above using the identifier and, for example, handshake protocols. Via a UPC code or other device identifier code, an individual sensor package is capable of uniquely identifying itself to the back-end systems 1) upon installation/start-up and 2) thereafter for all communications.

Preferably, the device comprises a GPS sensor for SPS unit location confirmation. Once activated on installation, the device can determine and transmit its location to a database for retention. The device may be enabled to transmit an alert if its controller determines from the GPS sensor that it has been moved from its assigned location, which may be indicative of theft or tampering.

The sensor package may further include one or more digital camera 125 and lens systems, such as BW and/or RGB cameras, that can capture high-speed frames at HD resolution, at fixed or variable rates determined by the need of the application or during a time frame as specified by instructions from the NOC, for example during a wildfire. In embodiments, the camera may be a wide-angle camera. Optionally, additional IR- or UV-capable cameras may be included.

The sensor package may further include a five-axis motion sensor-accelerometer and/or gyroscopic sensor for multiple axis movement detection. Other sensors may include a hygrometer, magnetometer, particle sensor, and/or temperature sensor for measuring environmental parameters.

An ePaper or LCD display may provide a visual indicator to a human inspector of the current status of the device. The ePaper display requires power only when being updated. To save power, the LCD display may be turned on by a user only when needed, either by a physical switch or an electronic signal from a handheld device. The display can provide utility personnel cable tension measurements and/or other parameters or statuses via digital read-out on field unit.

The Sensor Package Subsystem (SPS) is capable of simple installation. The embodiment shown an attachment 131 comprises two connecting bolts for attaching it to a cable. Easy start-up is enabled via UPC scan by an installer with a cellphone or other handheld device, which may instantly and automatically provide field unit location, such as its GPS location or a location number associated with the tower where it is located, Mac or PC ID serial number, communication protocol, etc. to the Back-end NOC System. Additional start-up activities may include ascertaining correct functioning of all sensors and communications.

A primary capability of the SPS includes measuring and capturing data for detection of instantaneous and long-term deviations from the initially installed and calibrated tension. Once a desired cable tension is set for the device, processor (s) in the device controller may determine that a deviation from that desired tension has occurred and initiate an alert notification to the NOC. Alternatively, the device may communicate tension data to the NOC, where processors at the NOC can determine deviations in tension data. Deviations may be determined by a tension reading that differs from a defined (e.g. installed) tension by a defined threshold value. Depending on what sensor(s) are included on a device, other measured data may be processed either at the device or in servers at the NOC. Data from a plurality of sensor devices may be aggregated at the NOC for group analysis.

Cameras included in the sensor package may provide viewing lengthwise along the cable to look for cable aberrations over time. Other camera capabilities may provide surveillance via video of the physical environment. One can appreciate that a camera location in the device may be dependent on the purpose of the video or still images collected. For example, cameras for a sensor 12 installed at the first position may be positioned to view downward toward ground level to observe whether there are humans or wildlife nearby the tower. Cameras for a sensor 14 installed at a second position may be positioned to observe the cable itself and/or its engagement to an insulator on the tower. Other cameras may also be positioned to view and capture video or still images for the general environment.

The controller on the device is programmed to trigger the periodic or as-needed collection of data from the sensors (e.g. data measurements collected four times per hour from all sensors). Other options may include periodic collection of data by a subset of sensors, wherein collection of data indicative of an error or alert event may trigger additional sensors to collect data. The controller on the device is also programmed to trigger alerts autonomously if measured parameters are out of set bounds. A signal for collecting data such as collecting still images or video by camera(s) on the device may be triggered by a motion detector on the device or in communication with the device.

The sensor package can communicate bi-directionally with the Back-end NOC System or other devices (e.g. local communication access node or handheld devices). Communication is desirably encrypted to deter hacking or other unauthorized attempts at communication from non-authorized sources.

The sensor package firmware/software is capable of being updated OTA (over-the-air) via firmware/software updates securely sent to it by the NOC.

Depending on the sensors in the sensor package it may be capable of measuring temperature, tension, sag and sway or other parameters when installed on high-voltage transmission wires.

The initial embodiment of the Sensor Package Subsystem is targeted at high voltage utility transmission towers. Its primary purpose is to monitor and confirm that the tension and spatial variation of the cable are within its design parameters over the life of the cable. Secondarily, the SPS monitors environmental elements, for example, structural changes of power transmission towers or smaller power poles; anchors or other connection points to which the cable is connected; and environmental hazards such as fire, smoke, wind; or trespassers, and/or vandalism in the vicinity; temperature of transmission lines, sway of transmission power lines or sway/physical degradation of insulators.

While the initial application of this invention as described herein is targeted at a utility transmission tower and associated stays and electrical lines, it will be seen by those skilled in the art, that it is equally applicable for any guy wire secured towers including but not limited to cellular infrastructure towers, microwave communication towers and the like.

Other structures with cable systems under tension include, for example, cable stay bridges and suspension bridges, wherein the towers are self-supporting and the cables support a horizontal load including a bridge deck and vehicles thereon. Other structures with cables under tension may include cable cars, cranes, etc. The sensors and back-end Notice Operations Center (NOC) system described herein can be adapted to provide a monitoring and surveillance system for such structures. The sensors described herein can be used to measure cable tension in such structures and communicate the measured tension to the back-end system to manage identification and reporting of status and/or faults in parameters measured by the Sensor Package Subsystem (to and from the field and to other entities). Further, the central back-end system can perform analysis, organize data, and/or create reports to enable regular monitoring of cable tension parameters to determine whether the parameters indicate degradation of performance predictive of a failure mode up to and including catastrophic failure.

Furthermore, the sensors and back-end Network Operations Center (NOC) system described herein can be adapted to provide a monitoring and surveillance system useful for monitoring infrastructure beyond electric transmission lines and other cable-containing structures. For example, if sensor packages can measure parameters other than cable tension such as flex, strain, compression, etc., the back-end system can be used to monitor parameters for other structures such as bridges, overpasses, buildings, radio, television or other antennae, etc. to determine whether the parameters indicate erosion of performance predictive of a failure mode up to and including catastrophic failure.

EMBODIMENTS

In the Embodiments below, the devices may also be designated as Sensor Package Subsystems or SPSs.

Embodiment 1. A device for attachment to a static cable or wire system under tension, comprising a controller; a cable tension sensor; and a communications module for wireless bi-directional communication with a central monitoring system.

Embodiment 2. The device of Embodiment 1, wherein the tension sensor is configured to measure and capture instantaneous and long-term deviations from a desired tension in the cable it is attached to.

Embodiment 3. The device of Embodiment 1, further comprising a modem for communication to the back-end and central monitoring system.

Embodiment 4. The device of Embodiment 1, further comprising a UPC code for unique device identification and communication purposes.

Embodiment 5. The device of Embodiment 1, further comprising a digital camera and lens system that can capture frames at high speed.

Embodiment 6. The device of Embodiment 1, further comprising an optional IR or UV capable camera and/or lens system.

Embodiment 7. The device of Embodiment 1, further comprising a GPS sensor.

Embodiment 8. The device of Embodiment 1, further comprising a 5-axis motion sensor-accelerometer (3-axis) and gyroscopic sensor (2-axis).

Embodiment 9. The device of Embodiment 1, further comprising a magnetometer.

Embodiment 10. The device of Embodiment 1, further comprising a temperature sensor.

Embodiment 11. The device of Embodiment 1, further comprising a digital clock or other timing unit.

Embodiment 12. The device of Embodiment 1, further comprising an uninterruptible power supply.

Embodiment 13. The device of Embodiment 1, further comprising a hygrometer to measure humidity.

Embodiment 14. The device of Embodiment 1, further comprising a toroidal-shaped version (housing) for placement on a high voltage line configured to clamp around the high-voltage line.

Embodiment 15. The device of Embodiment 14, further comprising a voltage sensor.

Embodiment 16. The device of Embodiment 14, further comprising an amperage sensor.

Embodiment 17. The device of Embodiment 14, further comprising a tension load sensor.

Embodiment 18. A computer-implemented method for using the device of any of Embodiment 1-17 with the computer-implemented method comprising: a concentrator server providing a means of communication for the device of claim 1; and a back-end server and Network Operating Center (NOC) for processing data and communicating with outside entities.

Embodiment 19. The computer-implemented method of Embodiment 18, further comprising Concentrator Servers providing a secure connection and feeding directly to the Network Operating Center (NOC).

Embodiment 20. The computer-implemented method of Embodiment 18, further comprising collecting and managing all data from the field SPSs at the NOC via dedicated VPN Servers.

Embodiment 21. The computer-implemented method of Embodiment 18, further comprising connecting authorized Utility Staff to each and every SPS at any tower via a secure wireless link from the NOC.

Embodiment 22. The computer-implemented method of Embodiment 18, further comprising two-way communication with an individual SPS, several SPS Groups or all SPS, via Wi-Fi or cellular connectivity.

Embodiment 23. The computer-implemented method of Embodiment 18, further comprising connecting the NOC to customer management and maintenance personnel through secure Internet.

Embodiment 24. The computer-implemented method of Embodiment 18, further comprising storing SPS-related information at the back-end server and associated database.

Embodiment 25. The computer-implemented method of Embodiment 24, wherein the SPS related information includes at least a subset of: SPS ID, location, communication channel ID, and type of wireless protocols.

Embodiment 26. The computer-implemented method of Embodiment 18, further comprising sending instructions to individual SPS, or to specific SPS Groups or to all SPS from the NOC through the back-end server to control the SPS functions associated with the monitoring, surveillance and notification.

Embodiment 27. The computer-implemented method of Embodiment 18, further comprising providing to the back-end-server power consumption data of the SPS.

Embodiment 28. The computer-implemented method of Embodiment 18, further comprising sending over-the-air firmware/software updates to the SPS unit(s).

Embodiment 29. The computer-implemented method of Embodiment 18, further comprising providing to the back-end server information related to characteristics, conditions and functionality of the SPS, including functional irregularities.

Embodiment 30. The computer-implemented method of Embodiment 18, further comprising enabling discovery of peripherals connected to a given SPS.

Embodiment 31. The computer-implemented method of Embodiment 18, further comprising enabling external devices to be connected to a given SPS.

Embodiment 32. The computer-implemented method of Embodiment 31, further comprising communicating instructions to the controller to supply an auxiliary power to external devices connected to the given SPS.

Embodiment 33. The computer-implemented method of Embodiment 18, further comprising enabling network topology identification including grouping and zoning of the SPSs.

Embodiment 34. The computer-implemented method of Embodiment 18, further comprising enabling multidimensional grouping of the SPSs for programmatic control and monitoring of the customers' assets, for example guy wires, towers, high voltage lines.

Embodiment 35. The computer-implemented method of Embodiment 18, further comprising enabling determination and sharing of SPS configuration information among a grouping of SPSs.

Embodiment 36. The computer-implemented method of Embodiment 18, further comprising enabling one or more sensors on a given SPS to report information on the SPS's functions and conditions to the back-end server.

Embodiment 37. The computer-implemented method of Embodiment 18, further comprising gathering, processing, organizing, and analyzing data.

Embodiment 38. The computer-implemented method of Embodiment 37, further comprising comparing data of other like, similar or different SPS units over multiple variables (e.g. time, space, tension load, torsion, and video image progression) to detect variations.

Embodiment 39. The computer-implemented method of Embodiment 37, further comprising tracking near and long-term trends of data from a single field unit and making comparative analyses, in particular relative to a required standard.

Embodiment 40. The computer-implemented method of Embodiment 37, further comprising monitoring video data from field unit(s) to detect variations in the physical environment 1) relative to a required standard or 2) over time, set to a particular trigger.

Embodiment 41. The computer-implemented method of Embodiment 18, further comprising providing applications to implement an emergency alert notification system using the back-end associated with the NOC.

Embodiment 42. The computer-implemented method of Embodiment 41, wherein the emergency alert notification system is directed to an appropriate entity or entities, for example to the utility, fire district and/or public safety.

Embodiment 43. The computer-implemented method of Embodiment 41, wherein the emergency alert notification system is part of a community wide alert system.

The invention claimed is:

1. A device configured for attachment to a cable or wire under tension, the device comprising one or more processors; a tension sensor configured to measure tension in a cable or wire to which it is attached; and a communications module for wireless bi-directional communication with a central monitoring system, wherein the one or more processors is configured to execute computer readable instructions to receive a tension measurement from the tension sensor and communicate the tension measurement to the central monitoring system via the communications module.

2. The device of claim 1, wherein the one or more processors is further configured to execute computer readable instructions to determine whether the tension measurement received from the tension sensor comprises an instantaneous or long-term deviation from a desired tension in the cable the tension sensor is attached to; and communicate the instantaneous or long-term deviation to the central monitoring system.

3. The device of claim 1 comprising a battery and solar cell for powering the device, and optionally further configured to attach to a power transmission line and receive power via electromagnetic induction from the power transmission line.

4. A distributed networked computer system for remote monitoring of cable systems under tension, the distributed network computer system comprising:

- a central monitoring system comprising one or more centralized servers configured to execute computer readable instructions to receive, collect, store and analyze data related to the remote monitoring;
- a plurality of devices attached to a plurality of cables or wires under tension; each device comprising one or more processors; a tension sensor configured to measure tension in a cable or wire to which it is attached; and a communications module for wireless bi-directional communication with the central monitoring system, wherein the one or more processors is configured to execute computer readable instructions to receive a tension measurement from the tension sensor and communicate the tension measurement to the central monitoring system via the communications module.

5. The distributed networked computer system of claim 4 wherein the cable system comprises a high voltage transmission system comprising towers and high voltage transmission lines supported by the towers; and the devices are attached to guywires stabilizing the towers, the high voltage transmission lines or a combination of guys wires and high voltage transmission lines.

6. The distributed networked computer system of claim 4, wherein stored data comprises information associated with each of the plurality of devices comprising one or more of device identification code, device location, communication channel identification, device characteristics, device condition and device functionality.

7. The distributed networked computer system of claim 6, wherein the stored data further comprises tension measurements received from each of the plurality of devices linked to the information associated with each device.

8. The distributed networked computer system of claim 4, wherein the one or more processors on each of the plurality of device or one or more processors in the one or more servers is further configured to execute computer readable instructions to determine whether the tension measurement received from the tension sensor of each of the plurality of devices comprises an instantaneous or long-term deviation from a desired tension in the cable the tension sensor is attached to.

9. The distributed networked computer system of claim 4 further comprising a plurality of local access nodes associated with the plurality of devices, one or more concentrator servers, or a combination of local access nodes and one or more concentrator servers configured to provide secure communications links among the plurality of devices and the central monitoring system.

10. The distributed networked computer system of claim 4 further comprising secure communication links to a plurality of devices associated with a plurality of authorized human users of the distributed networked computer system.

11. The distributed networked computer system of claim 4 further comprising secure communication links between the plurality of devices associated with a plurality of authorized human users of the distributed networked computer system and the plurality of devices attached to the plurality of cables or wires under tension.

12. The distributed networked computer system of claim 11 wherein the secure communication links comprise a self-organizing network.

13. The distributed networked computer system of claim 4 wherein the one or more processors on the centralized servers are configured to execute computer readable instructions to receive data from the plurality of devices;

store the data received from the plurality of devices;

aggregate the data received from the plurality of devices;

determine whether the aggregated data are predictive or indicative of a failure mode in the cable system; and communicate an alert related to the failure mode to one or more human users authorized to receive the alert.

14. The distributed networked computer system of claim 13 wherein the one or more human users comprise operators of the central monitoring system, personnel associated with the owner or operator of the cable system, personnel associated with emergency response services, or combinations thereof.

15. The distributed networked computer system of claim 4 wherein the one or more processors on the centralized servers are further configured to execute computer readable instructions to compare data received from a set of the devices over one or more variables selected from time, location, tension, tension load, torsion and video image progression to detect variations among the set of devices.

16. The distributed networked computer system of claim 4 wherein the one or more processors on the centralized servers are further configured to execute computer readable instructions to track trends in the data from a single device for comparative analyses.

17. The distributed networked computer system of claim 4 wherein the one or more processors on the centralized servers are further configured to execute computer readable instructions to enable one or more of discovery of peripherals connected to a given device, communicate instructions to the given device to enable connecting a peripheral to the given device, and communicate instructions to one or more processors on the given device to supply auxiliary power to a peripheral connected to the given device.

18. A method executed by one or more computing devices for remote monitoring of cable systems under tension, the method comprising:

receiving data from a plurality of devices attached to a plurality of cables or wires under tension; each device comprising one or more processors; a tension sensor configured to measure tension in a cable or wire to which it is attached; and a communications module for wireless bi-directional communication with a central monitoring system, wherein the one or more processors is configured to execute computer readable instructions to receive a tension measurement from the tension sensor and communicate the tension measurement to the central monitoring system via the communications module;

storing the data received from the plurality of devices;

aggregating the data received from the plurality of devices;

determining whether the aggregated data are predictive or indicative of a failure mode in the cable system; and communicating an alert related to the failure mode to one or more human users authorized to receive the alert.

19. The method of claim 18 wherein the one or more computing devices are instantiated in a distributed networked computer system comprising:

the central monitoring system comprising one or more centralized servers configured to execute computer readable instructions to receive, collect, store and analyze data related to the remote monitoring; and the plurality of devices attached to the plurality of cables or wires under tension.

20. The method of claim 18 wherein the one or more human users comprise operators of the central monitoring system, personnel associated with the owner or operator of the cable system, personnel associated with emergency response services, or combinations thereof.

21. The method of claim 18 wherein communications comprise a self-organizing network.

22. At least one non-transitory computer-readable medium storing computer-readable instructions for remote monitoring of cable systems under tension, when executed by one or more computing devices of a distributed networked computer system, cause at least one of the one or more computing devices to:

receive data from a plurality of devices attached to a plurality of cables or wires under tension; each device comprising one or more processors; a tension sensor configured to measure tension in a cable or wire to which it is attached; and a communications module for wireless bi-directional communication with a central monitoring system, wherein the one or more processors is configured to execute computer readable instructions to receive a tension measurement from the tension sensor and communicate the tension measurement to the central monitoring system via the communications module;

store the data received from the plurality of devices;

aggregate the data received from the plurality of devices;

determine whether the aggregated data are predictive or indicative of a failure mode in the cable system; and communicate an alert related to the failure mode to one or more human users authorized to receive the alert.

23. The at least one non-transitory computer-readable medium of claim 22 wherein the one or more computing devices are instantiated in a distributed networked computer system comprising:

the central monitoring system comprising one or more centralized servers configured to execute computer readable instructions to receive, collect, store and analyze data related to the remote monitoring; and the plurality of devices attached to the plurality of cables or wires under tension.

24. The at least one non-transitory computer-readable medium of claim 22 wherein the one or more human users comprise operators of the central monitoring system, personnel associated with the owner or operator of the cable system, personnel associated with emergency response services, or combinations thereof.

25. The at least one non-transitory computer-readable medium of claim 22 wherein communications comprise a self-organizing network.

26. The device of claim 1 further comprising at least one additional sensor selected from a voltage sensor, an amperage sensor or a tension load sensor, wherein the one or more processors is configured to execute computer readable instructions to receive a measurement from the at least one additional sensor and communicate the measurement to the central monitoring system.

* * * * *